US011799865B2

(12) United States Patent
Chan et al.

(10) Patent No.: US 11,799,865 B2
(45) Date of Patent: Oct. 24, 2023

(54) MULTI-CHAMBER HOSTED COMPUTING ENVIRONMENT FOR COLLABORATIVE DEVELOPMENT BETWEEN UNTRUSTED PARTNERS

(71) Applicant: Microsoft Technology Licensing, LLC, Redmond, WA (US)

(72) Inventors: Bella P. Chan, Bellevue, WA (US); Darin Zhen, Redmond, WA (US); Prashant Varshney, Fremont, CA (US); Youn Tae Chung, Seoul (KR); Scott Gorlick, Snohomish, WA (US); Mujtaba Hamid, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 388 days.

(21) Appl. No.: 17/127,995

(22) Filed: Dec. 18, 2020

(65) Prior Publication Data
US 2022/0200997 A1     Jun. 23, 2022

(51) Int. Cl.
*H04L 9/40*     (2022.01)
*H04L 67/56*     (2022.01)
(Continued)

(52) U.S. Cl.
CPC ........ *H04L 63/102* (2013.01); *G06F 9/45558* (2013.01); *G06F 21/105* (2013.01);
(Continued)

(58) Field of Classification Search
CPC ... H04L 63/102; H04L 12/1813; H04L 67/56; G06F 9/45558; G06F 21/105;
(Continued)

(56) References Cited

U.S. PATENT DOCUMENTS 7,353,468 B2   4/2008   Ferguson et al.
7,546,571 B2   6/2009   Mankin et al.
(Continued)

OTHER PUBLICATIONS

"International Search Report and Written Opinion Issued in PCT Application No. PCT/US21/058373", dated Mar. 29, 2022, 11 Pages. (MS# 409111-WO-PCT).
(Continued)

*Primary Examiner* — Bruce S Ashley
(74) *Attorney, Agent, or Firm* — WORKMAN NYDEGGER

(57) ABSTRACT

A collaboration computing environment can be established for facilitating collaboration among multiple users where is distrust between them. The collaboration computing environment comprises one or more chambers that provide data security by limiting data access pathways, deactivating data access functionality and providing an indirect data upload path. Individual users, or defined groups of users, such as users associated with a specific entity, can utilize computing functionality provided within the confines of a single chamber to execute computer-executable instructions and, thereby, consume existing data and generate modified and/or new data. To facilitate collaboration, a shared storage can be enabled in the collaboration computing environment to which multiple chambers can be provided at least some form of access. Further collaboration is facilitated through a collaboration chamber, which can comprise computing environments, such as virtual machines, that can be established to require multiple simultaneous logins.

18 Claims, 9 Drawing Sheets

(51) Int. Cl.
*G06F 9/455* (2018.01)
*G06F 21/10* (2013.01)
*H04L 12/18* (2006.01)

(52) U.S. Cl.
CPC .......... *H04L 12/1813* (2013.01); *H04L 67/56* (2022.05); *G06F 2009/4557* (2013.01); *G06F 2009/45583* (2013.01); *G06F 2009/45595* (2013.01); *G06F 2221/0717* (2013.01)

(58) Field of Classification Search
CPC ... G06F 2009/4557; G06F 2009/45583; G06F 2009/45595; G06F 2221/0717; G06F 9/543; G06F 9/544; G06F 21/53; G06F 21/6218; G06F 9/5077
See application file for complete search history.

(56) References Cited

U.S. PATENT DOCUMENTS

| | | | |
|---|---|---|---|
| 8,032,846 | B1 | 10/2011 | Balasubramanian et al. |
| 10,387,682 | B2 | 8/2019 | Kalafala et al. |
| 10,445,699 | B2 | 10/2019 | Cabler et al. |
| 10,452,802 | B2 | 10/2019 | Irissou et al. |
| 10,503,855 | B2 | 12/2019 | Ledzius et al. |
| 2010/0146501 | A1* | 6/2010 | Wyatt .................. G06F 21/84 718/1 |
| 2011/0185437 | A1* | 7/2011 | Tran ...................... H04L 63/104 726/28 |
| 2015/0379183 | A1 | 12/2015 | Odabasi et al. |
| 2019/0278907 | A1* | 9/2019 | Boivie .................. H04L 9/006 |
| 2019/0362075 | A1* | 11/2019 | Krfz ..................... G06F 21/562 |
| 2020/0134207 | A1* | 4/2020 | Doshi ................. H04L 41/0893 |

OTHER PUBLICATIONS

"And IT All Starts with Universities", Retrieved from: https://web.archive.org/web/20180819224017/https:/siliconcloudinternational.com/overview/, Aug. 19, 2018, 2 Pages.

"Azure Command-Line Interface (CLI) documentation", Retrieved from: https://docs.microsoft.com/en-us/cli/azure/?view=azure-cli-latest, Retrieved Date: Apr. 10, 2020, 4 Pages.

"Azure PowerShell documentation", Retrieved from: https://docs microsoft com/en-us/powershell/azure/, Retrieved Date: Apr. 10, 2020, 4 Pages.

"Azure REST API Reference", Retrieved from: https://docs.microsoft.com/en-us/rest/api/azure/, Apr. 7, 2020, 15 Pages.

"Cadence", Retrieved from: https://registration.cadence.com/CadenceApplicationLoginScreen?appcode=cos&langcode=en, Retrieved Date: Apr. 10, 2020, 3 Pages.

"Cloud-Hosted Design Solution", In White Paper of Cadence, Jul. 8, 2020, 7 Pages.

"Code, collaborate, and ship securely—from anywhere. Invent with purpose", Retrieved from: https://web.archive.org/web/20200713110521/https:/azure.microsoft.com/en-us/, Jul. 13, 2020, 11 Pages.

"Python", Retrieved from: https://www.python.org/, Retrieved Date: Apr. 10, 2020, 4 Pages.

"Samsung Provides One-Stop Foundry Design Environment with the Launch of 'SAFE™ Cloud Design Platform'", Retrieved from: https://news.samsung.com/global/samsung-provides-one-stop-foundry-design-environment-with-the-launch-of-safe-cloud-design-platform, Jun. 18, 2020, 5 Pages.

"Semiconductor and Electronics", Retrieved from: https://web.archive.org/web/20190715143504/https:/aws.amazon.com/manufacturing/semiconductor-electronics/, Jul. 15, 2019, 10 Pages.

"Synopsys Announces Availability of TSMC-certified IC Design Environment in the Cloud", Retrieved from: https://news.synopsys.com/2018-10-03-Synopsys-Announces-Availability-of-TSMC-certified-IC-Design-Environment-in-the-Cloud, Oct. 3, 2018, 5 Pages.

Hamid, et al., "Azure for the Semiconductor Industry", In White paper of Azure, May 2018, 23 Pages.

Man, et al., "Cloud-EDA:a PaaS platform architecture and application development for IC design & test", In International Conference on Cloud Computing and Internet of Things, Mar. 2015, pp. 1-4.

Peterson, et al., "Use the Azure libraries (SDK) for Python", Retrieved from: https://docs.microsoft.com/en-us/azure/developer/python/azure-sdk-overview, Sep. 19, 2020, 5 Pages.

Rossum, et al., "Style Guide for Python Code", Retrieved from: https://www.python.org/dev/peps/pep-0008/, Jul. 5, 2001, 39 Pages.

Wheeler, et al., "What is PowerShell?", Retrieved from: https://docs.microsoft.com/en-us/powershell/scripting/overview?view=powershell-7, May 22, 2020, 6 pages.

* cited by examiner

MULTI-CHAMBER HOSTED COMPUTING ENVIRONMENT FOR COLLABORATIVE DEVELOPMENT BETWEEN UNTRUSTED PARTNERS

BACKGROUND

Increasingly, computing environments need not be supported by hardware that is physically co-located with the users utilizing such computing environments, but rather can be hosted by networked computing hardware aggregated into large data centers that are physically remote from the user. Often such computing environments are referred to as "cloud computing environments" and are typically supported by virtual machines hosted by large collections of computing hardware that provide stability, redundancy, and high availability. While cloud computing environments can be utilized by users on an individual basis, they also facilitate collaboration among multiple users, which can be especially useful in situations where those users are physically distant from one another and travel to a common location can be impractical or even prohibited.

Collaboration among multiple users in a cloud computing environment requires a trusted relationship among the multiple users because the collaboration necessarily makes available at least some secrets of the users. In particular, the administrators of such environments have nearly universal capabilities within the environments, including the ability to add and/or remove users, grant and/or deny access to data, and otherwise provision the environments as they choose. Accordingly, in situations where collaboration is necessary between users or parties who do not fully trust each other, cloud computing environments have represented an unacceptable risk, despite the logistical advantages they can provide An additional difficulty in utilizing cloud computing environments for collaboration endeavors is that the generation and provisioning of cloud computing environments is tedious and time-consuming, even for straightforward single-user cloud computing environments. Often the users or entities that could benefit from utilizing cloud computing environments for collaboration endeavors can only utilize turn-key solutions and do not have dedicated support staff to properly provision such cloud computing environments.

SUMMARY

A collaboration computing environment can be established for facilitating collaboration among multiple users that do not trust each other. The collaboration computing environment comprises one or more chambers that provide data security by limiting data access pathways, deactivating data access functionality and providing an indirect data upload path. Individual users, or defined groups of users, such as users associated with a specific entity, can utilize computing functionality provided within the confines of a single chamber to execute computer-executable instructions and, thereby, consume existing data and generate modified and/or new data. Each user, or defined group of users, can utilize the computing functionality provided within the confines of a single chamber such that the users, or defined groups of users, are computationally separated from one another by the chamber boundaries that are implemented and maintained by the aforementioned limited data access pathways, deactivated data access functionality and indirect data upload paths. To facilitate collaboration, a shared storage can be enabled in the collaboration computing environment to which multiple chambers can be provided at least some form of access, including read/write access to discrete per-chamber portions of the shared storage, read-limited and, respectively, write-limited access to multi-chamber-accessible portion of the shared storage, or combinations thereof. Further collaboration is facilitated through a collaboration chamber, which can comprise computing environments, such as virtual machines, that can be established to require multiple simultaneous logins. Such multiple simultaneous logins can be established to require at least two counterparty users representing either single users, or multi-user entities, among whom there is a measure of distrust. Each user is then provided a shadow session such that they can monitor the activities of the counterparty, untrusted user, thereby enabling collaboration among untrusted users and/or entities having multiple users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
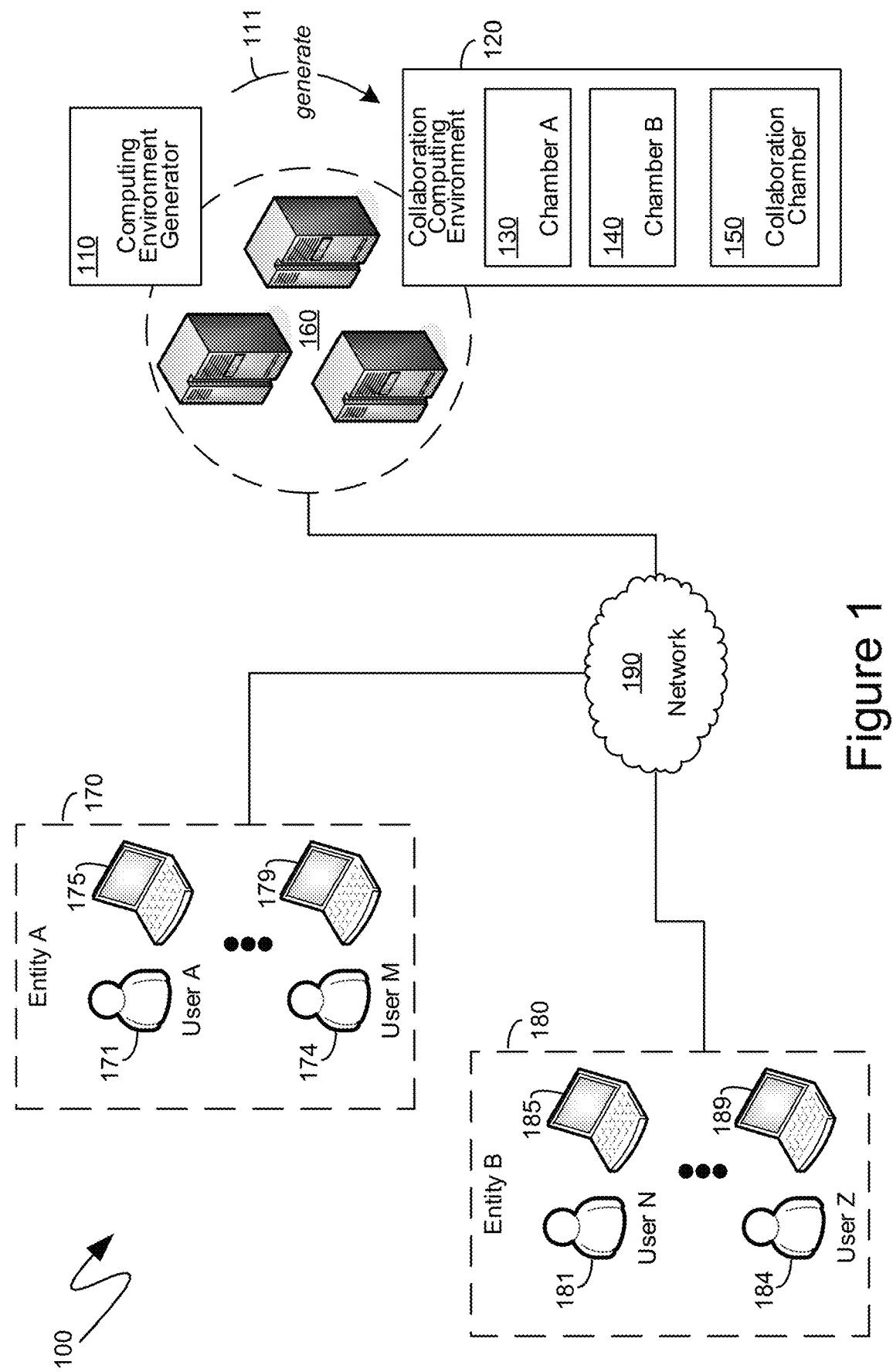
FIG. 1 is a system diagram of an exemplary system providing a hosted computing environment for collaboration between untrusted partners.

The following description relates to the generation, establishment, maintenance and operation of computing environments that enable and facilitate collaboration between untrusted users or multi-user entities. The collaboration computing environments described can be provided by a third party, such as by a hosted computing platform, a cloud computing provider, or other like network-accessible, remotely-hosted computing environment service provider. The collaboration computing environment comprises one or more chambers that provide data security by limiting data access pathways, deactivating data access functionality and providing an indirect data upload path. Individual users, or defined groups of users, such as users associated with a specific entity, can utilize computing functionality provided within the confines of a single chamber to execute computer-executable instructions and, thereby, consume existing data and generate modified and/or new data. Each user, or defined group of users, can utilize the computing functionality provided within the confines of a single chamber such that the users, or defined groups of users, are computationally separated from one another by the chamber boundaries that are implemented and maintained by the aforementioned limited data access pathways, deactivated data access functionality and indirect data upload paths. To facilitate collaboration, a shared storage can be enabled in the collaboration computing environment to which multiple chambers can be provided at least some form of access, including read/write access to discrete per-chamber portions of the shared storage, read-limited and, respectively, write-limited access to multi-chamber-accessible portion of the shared storage, or combinations thereof. Further collaboration is facilitated through a collaboration chamber, which can comprise computing environments, such as virtual machines, that can be established to require multiple simultaneous logins. Such multiple simultaneous logins can be established to require at least two counterparty users representing either single users, or multi-user entities, among whom there is a measure of distrust. Each user is then provided a shadow session such that they can monitor the activities of the counterparty, untrusted user, thereby enabling collaboration among untrusted users and/or entities having multiple users.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. In the exemplary system 100, a hosted computing environment, in the form of the collaboration computing environment 120, is illustrated as being hosted by computing devices 160, which can be server computing devices, such as would commonly be found in the data center, or any other locally and/or remotely accessible computing device that can host a computing environment that can be accessed and utilized by users, such as the exemplary users illustrated in FIG. 1. Traditionally, hosted computing environments were not usable for collaborative endeavors between individuals or groups of individuals that did not have an established trust relationship between them. For example, FIG. 1 shows two distinct entities in the form of the exemplary entities 170 and 180. As utilized herein, the term entity means any identifiable group of one or more users that share a common purpose or trust between them. Thus, entities include corporations, subdivisions within corporations, associations, clubs, families, or any other like identifiable group of one or more users. In the context of hosted computing environments, the entity 170 can instruct an individual, such as the user 171, to establish a hosted computing environment that other users that are part of the entity 170, such as the exemplary user 174, can utilize, such as in their performance of work or other tasks in furtherance of the goals of the entity 170. In such an instance, the user 171, in setting up a hosted computing environment, would act as the administrator of such a hosted computing environment, and would have administrative privileges, including the ability to add or remove users, change permissions, establish data access rights, and other like administrative privileges.

Should the entity 170 then seek to collaborate with the entity 180, where there is distrust between the entities 170 and 180, such as, for example, if the entity 180 was another corporation in the same market, then the hosted computing environment established by the entity 170 can offer no protections to users from the entity 180. More specifically, because the user 171, as an administrator, would have the ability to access any data, and execute any function, within the hosted computing environment established by the user 171 as the administrator, the users of the entity 180, such as the exemplary users 181 and 184, could not protect any information, executable code, functionality, or other aspects that may be trade secrets or otherwise held to be proprietary and confidential by the entity 180.

Instead, in instances where collaboration between the entities 170 and 180 was desired, the only solution was for one or more users, such as the exemplary users 171, 174, 181 and 184, to physically travel to a location where the users would be physically co-located and could collaborate utilizing traditional computing hardware and traditional security protocols.

In many instances, however, it can be suboptimal, or even not possible, for users to physically travel to joint locations. For example, entities 170 and 180 can be geographically distant from one another, such that travel and extended stays can incur substantial expense and inefficiency. As another example, external circumstances, such as pandemics, governmental change, or other like circumstances, can prevent the requisite travel.

As utilized above, the term "trust" is utilized in the colloquial sense of meaning a degree of confidence that a counterparty will (or will not) perform an action that they indicated they would (or would not) perform. In the relevant arts, however, the term "trust" is also utilized in a technical sense, such as a "root of trust", that refers to a baseline context upon which the relevant computer security systems are based. While such a technical use of the term "trust" is not intended by the above descriptions, the detailed mechanisms described herein do utilize computer security systems that are premised upon a common federated identity plane between the users and/or entities. For example, to provide a common mechanism by which users can be verified to be who their credentials claim they are, an administrator of one entity can utilize a directory service to create a tenant and invite users from the other entity to the tenant, which can then be utilized to provision the roles of the users, such as to enable (and prevent, as appropriate) the mechanisms and protections detailed below.

To facilitate collaboration between two or more entities and/or individual users, where a trust relationship does not exist between such entities and/or users, a collaboration computing environment, such as the exemplary collaboration computing environment 120, can be established on behalf of the entities and/or users. More specifically, a third party can execute a computing environment generator, such as the exemplary computing environment generator 110, which can generate, as illustrated by the action 111, a collaboration computing environment that can provide security and isolation between two collaborating entities and/or individual users, vis-à-vis one another, that can facilitate collaboration between two or more such entities and/or individual users without the existence of a trust relationship between them. More specifically, and as will be detailed further below, the exemplary collaboration computing environment 120 can comprise independent and isolated chambers, such as the exemplary chambers 130 and 140, that can implement protections that can limit the transfer of data from within the chambers to destinations outside of the chambers, thereby affording the privacy and data protection sought by the entities individually. In addition, and as will also be detailed further below, the exemplary collaboration computing environment 120 can comprise a collaboration chamber, such as the exemplary collaboration chamber 150, that can enable concurrent access so that one user cannot perform an action without an un-trusted counterparty being simultaneously logged in and aware of the action. In the exemplary system 100 of FIG. 1, for example, if the entity's 170 and 180 sought to collaborate with one another without a trust relationship between them, the collaboration chamber 150 can be established such that at least one user from the entity 170, such as, for example, one of the users 171 or 174, would it needs to be simultaneously logged on as at least one user from the entity 180, such as, for example one of the users 181 or 184. Only when both required users are simultaneously available can any one user perform actions within the collaboration chamber 150, which actions would be detectable and able to be monitored by the other user. In such a manner, collaboration between entities that do not have an established trust relationship between them can be facilitated utilizing hosted computing environments, thereby obviating the need to engage in inefficient travel and other like inefficiencies inherent in current collaborative processes between untrusted entities.

Figure 2:
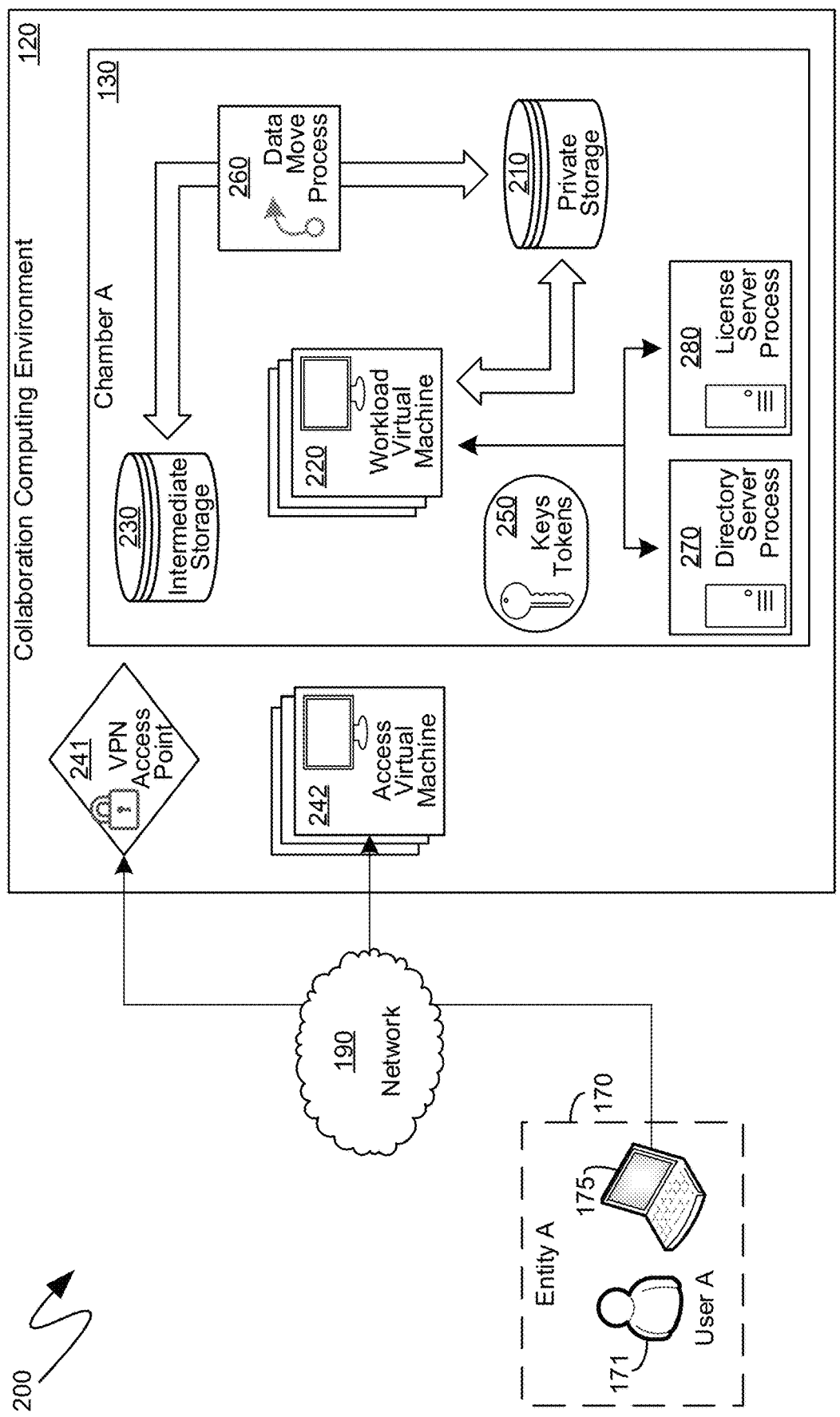
FIG. 2 is a system diagram of an exemplary collaboration computing environment with a single-entity chamber.

Turning to FIG. 2, the exemplary system 200 shown therein illustrates an exemplary chamber, such as the exemplary chamber 130, with attendant aspects, functionalities and processes that can be instantiated, established, or otherwise provided for, as an example, the entity 170, within the context of the exemplary collaboration computing environment 120. As utilized herein, the term "chamber" means the application of one or more protections, limitations, deactivations, or other like mechanisms that protect data by limiting access to such data, with the protected data, and correlated functionality being "inside" of the chamber, while the prevented functionality is "outside" of the chamber. Accordingly, the exemplary chamber 130 is illustrated as comprising a private storage, such as the exemplary private storage 210. Data access to the private storage can be limited to mechanisms that execute within the chamber 130. For example, data stored on the private storage 210 can be limited to only being read/write/execute accessible from virtual machines that execute within the context of the chamber 130, such as the exemplary one or more workload virtual machines 220. Attempts to access data stored in the private storage 210 from outside of the chamber 130 can be prevented through numerous mechanisms, such as, for example, not assigning a network address, or other like identifier, to the private storage 210 that is reachable from outside of the chamber 130, encrypting the private storage 210 and preventing the transmission of decryption keys outside of the chamber 130, requiring Shared Access Signature (SAS) tokens, or other like storage access tokens in order to access the private storage 210, or other like data access prevention mechanisms.

According to one aspect, to enable users, such as the exemplary user 171, to import data into the chamber 130 that the user can then act upon, such as by utilizing the workload virtual machine 220, instantiation of the chamber 130 can further comprise the establishment of an intermediate storage, such as the exemplary intermediate storage 230. As utilized herein, the term "instantiate" means to execute computer-executable instructions that implement, perform, or otherwise cause to exist the mechanisms that will implement the functionality that is indicated as being instantiated. Accordingly, instantiation of the chamber comprises the execution of computer-executable instructions that establish, trigger, perform or otherwise cause to exist the various features, aspects and functionality described herein as associated with the chamber. Additionally, as utilized herein, the term "establish", within the context of computer-readable data storage, means to initialize, partition, amount or otherwise delineate and/or prepare an amount of computer-readable data storage among one or more hardware data storage devices.

Turning back to FIG. 2, the intermediate storage 230 can act as a "landing" point for data imported by a user, such as, for example, data stored on the computing device 175. According to one aspect, to maintain the security of the chamber 130, access to the intermediate storage 230 can be limited. For example, one mechanism for accessing the intermediate storage 230, such as to upload data from the computing device 175, can be a Virtual Private Network (VPN) access point, such as the exemplary VPN access point 241. Access to the VPN access point 241 can be protected through cryptographic means, requiring the user 171 to provide identification and/or authentication information such as a username, user identifier, password, token, or other like identification and/or authentication information. In such a manner the ability to upload data to the intermediate storage 230 can be protected and limited via the VPN access point 241. Moreover, the VPN access point 241 allows a customer, such as the entity 170 and/or the individual user 171 to utilize their own computing hardware over which they maintain both physical possession and logical control, such as, for example, the exemplary computing device 175.

Alternatively, or in addition, another mechanism through which a user can access the intermediate storage 230, can be one or more hosted virtual machines, such as the exemplary access virtual machine 242. In such an instance, rather than a user or an entity maintaining physical and logical control over a computing device, the access virtual machine 242 can be hosted by a same hosting service, or an affiliated hosting service, as the service that is hosting the collaboration computing environment 120. Again, access to the access virtual machine 242 can be protected through login security requiring the user 171 to provide identification and/or authentication information such as a username, user identifier, password, token, or other like identification and/or authentication information, and, again, limiting access to the intermediate storage 230.

In addition to the authentication information described, the mechanisms described herein can utilize additional security tools to provide greater security. For example, access to the VPN access point 241 and/or the access virtual machine 242 can be further limited through access control lists that can enumerate specific individuals and/or computing devices, specific access parameters, network addresses, or other like aspects that can further limit how access is gained to the intermediate storage 230. Another mechanism that can be utilized is multifactor authentication that can require the user to provide not only the username and password, for example, but also additional information that can be obtained, transmitted, or otherwise derived utilizing out of band communications, such as a separate text message, email message, authentication application executing on a mobile computing device, such as a smart phone, or other like out of band communications.

As indicated previously, according to one aspect, the private storage 210 can be protected by insulating it from public networks, such as preventing the assigning of a publicly accessible network address, such as an IP address, utilizing various sub network and/or domain name security, and other like network isolation mechanisms. By contrast, as detailed, a user, such as the exemplary user 171, can be allowed to upload, through defined mechanisms, data to the intermediate storage 230. According to one aspect, a data move process, such as the exemplary data move process 260, can be executed as part of the instantiation of the chamber 130. More specifically, the data move process 260 can perform a one-way synchronization between the intermediate storage 230 and the private storage 210 such that when data is uploaded to the intermediate storage 230, such as in the manner detailed above, the data move process 260 can move and/or copy such data from the intermediate storage 232 the private storage 210. For example, the data move process 260 can listen or otherwise monitor the intermediate storage 230 for changes in the data stored therein, such as the addition of newly uploaded data. Upon the detection of such a change, such as the addition of newly uploaded data, the data move process 260 can move and/or copy such newly added data from the intermediate storage 230 to the private storage 210. In such a manner, the private storage 210 can remain accessible only to processes executing within the chamber 130, such as the exemplary data move process 260, and, because the private storage 210 can remain without any direct access from outside the chamber 130, it can, thereby, be secured.

According to one aspect, however, the private storage 210 can be accessed by one or more virtual machines executing within the context of the chamber 130, such as the one or more workload virtual machines 220 shown in FIG. 2. A user, such as the exemplary user 171, can access a workload virtual machine 220 through defined mechanisms external to the chamber 130, such as, for example, the access virtual machine 242. More specifically, access to the workload virtual machine 220 can be limited to specific computing devices, real and/or virtual, as part of the protection and isolation that delineates the chamber 130 as described herein. According to one aspect, access to the workload virtual machine 220 can be limited exclusively to one of the access virtual machines 242, such that access from any other computing device, real or virtual, can be denied or can otherwise not be possible. The exemplary user 171, therefore, would initially log into the access virtual machine 242 and, as a user of the access virtual machine 242, would then, through the access virtual machine 242, in turn, log into the workload virtual machine 220. In such a manner, access to the workload virtual machine 220 can be limited and, thereby, protected.

Additionally, the functionality of the workload virtual machine 220 itself can be limited. More specifically, and as detailed previously, one aspect that can cause concern between collaborating users and/or entities amongst whom there is not a trusted relationship can be the ability of an administrative user to bypass, deactivate, or otherwise not be subject to security safeguards. Accordingly, to address such a concern, the functionality of the workload virtual machine 220 can be limited at the hosting level, including by modifying the instantiation of the workload virtual machine 220. For example, the workload virtual machine 220 can have defined users and user accounts in a manner analogous to traditional computing devices, except that the workload virtual machine 220 can prevent, or otherwise not enable, the creation or existence of administrator accounts, root accounts, superuser accounts, or other like accounts or access rights. As another example, the workload virtual machine 220 can have defined operating system functionality analogous to traditional computing devices, except that the workload virtual machine 220 can deactivate, or otherwise prevent the invocation of, specific data transfer commands, such as access to file transfer protocol commands, file copy commands and other like data transfer commands. In such a manner, by limiting the functionality available through the workload virtual machine 220, data available to the workload virtual machine 220 via its access to the private storage 210 can remain within the chamber 130. Furthermore, because such limitations are not implemented by an administrator that is part of an entity involved in the collaboration, but rather are implemented at a hosting level, both parties in a collaboration can remain assured of the limitations imposed on their counterparty.

A user, such as the exemplary user 171, can utilize the workload virtual machine 222 perform functionality utilizing the data of the private storage 210. For example, the user 170 can have uploaded an initial data set and one or more applications or other like computer-executable instructions to the intermediate storage 230, and ultimately ending up on the private storage 210 via the data move process 260, as detailed above. The user can then execute those applications on the workload virtual machine 220, from the private storage 210, and consume the uploaded data utilizing such applications, with such data also being read from the private storage 210. Such actions can result in newly created data that can, in turn, be stored back onto the private storage 210 by the applications executing on the workload virtual machine 220. Mechanisms by which such newly created data can be collaboratively shared and utilized with other users and/or entities within the context of the collaboration computing environment 120 will be detailed further below.

The exemplary chamber 130 is further illustrated in FIG. 2 as comprising a keys and tokens 250, which can be retained on dedicated storage such as a Trusted Platform Module (TPM), special partition of a hard drive, or other like storage area in which such various keys, tokens and other like cryptographic or security information can be stored. The keys and tokens 250 can include SAS tokens that can limit access to one or more of the intermediate storage 230, the private storage 210, or other shared storage, such as will be detailed further below. Additionally the keys and tokens 250 can comprise cryptographic information utilized to, for example, verify and authenticate users, secure data during transmission, and at rest, and perform other like cryptographic and/or security functionality.

The exemplary chamber 130 is also illustrated as comprising a directory server process, such as the exemplary directory server process 270. The exemplary directory server process 270 can provide directory services, such as user identification, access rights, and other like directory services to the workload virtual machine 220. According to one aspect the exemplary directory server process 270 can aid in the aforementioned limitations that constrain data exporting functionality of the workload virtual machine 220.

In some instances, computer-executable instructions, such as the applications that a user would execute on the workload virtual machine 220, can require license verification, or other licensing infrastructure. In such an instance, a license server process, such as the exemplary license server process 280 can execute within the confines of the chamber 130 to provide relevant licensing information and enable the execution of applications that the user 171 desires to use.

Figure 3:
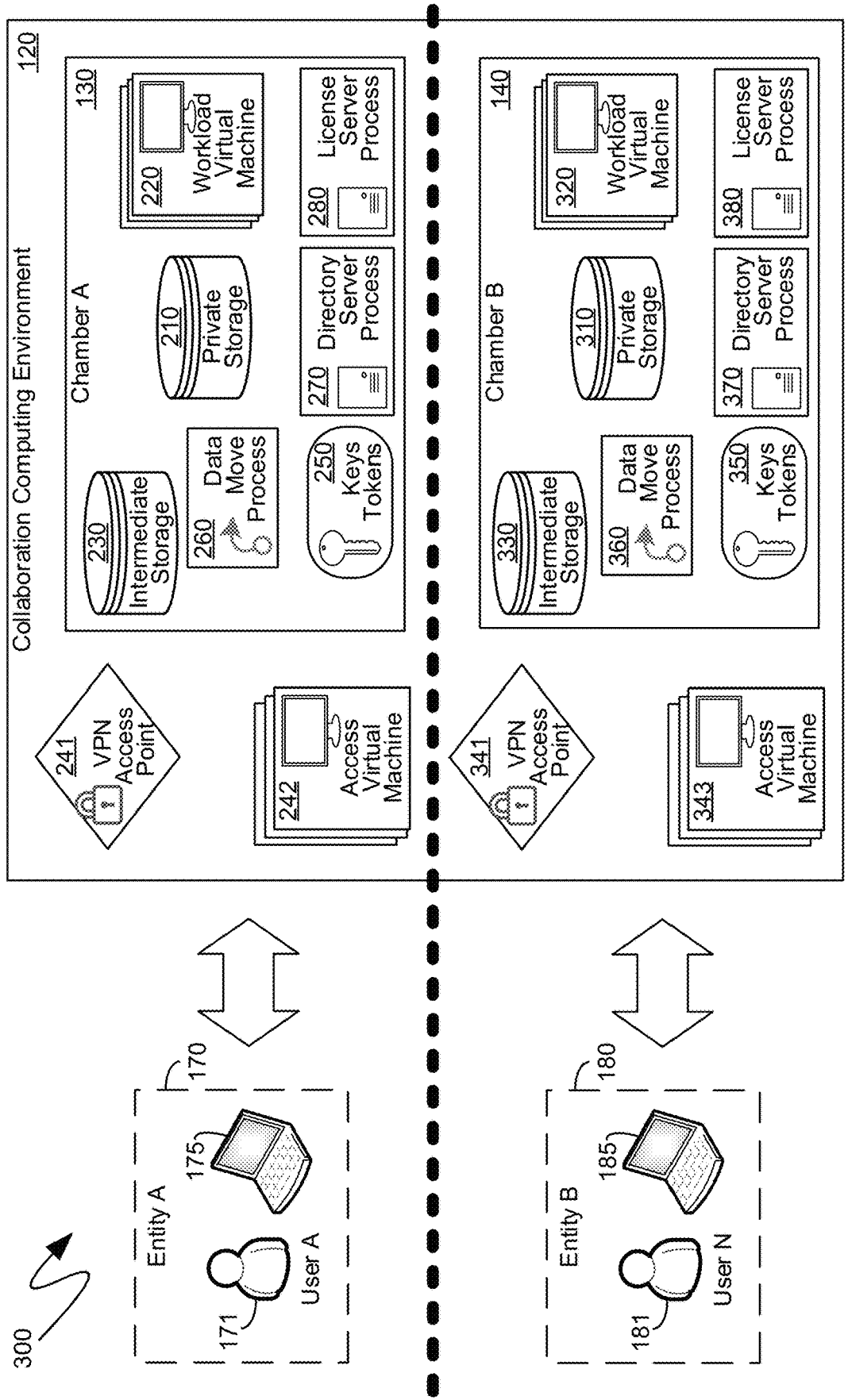
FIG. 3 is a system diagram of an exemplary collaboration computing environment with multiple distinct and isolated single-entity chambers.

Turning to FIG. 3, an exemplary system 300 shown therein illustrates the exemplary collaboration computing environment 120 with two distinct and isolated chambers, namely the exemplary chamber 130, whose functionality was detailed above, and a second chamber, namely the exemplary chamber 140. Like the aforedescribed chamber 130, the exemplary chamber 140 can comprise a private storage 310 that can operate in a manner analogous to the private storage 210 described above, a workload virtual machine 320 that can operate in a manner analogous to the workload virtual machine 220, keys and tokens 350 analogous to the keys and tokens 250, a directory server process 370 analogous to the directory server process 270 and a license server process 380 analogous to the license server process 280. Similarly, mechanisms associated with the chamber 140, such as the exemplary VPN access point 341, analogous to the VPN access point 241, and/or the access virtual machine 342, analogous to the access virtual machine 242, can be created and/or instantiated as part of the collaboration computing environment 120. In a hosted environment, the VPN access point 341 need only be a separate instance of a VPN access point provided by the hosting environment, and, as such, can be implemented together with other VPN access points, such as the exemplary VPN access point 241. Analogously, the access virtual machine 342 can be another hosted virtual computing environment analogous to the access virtual machine 242.

The entity 180, such as individual users associated with the entity 180, such as the exemplary user 181, can utilize the chamber 140, such as by logging into the workload virtual machine 320 and executing applications that utilize uploaded data indirectly copied and/or moved to the private storage 310 to generate new data as part of the collaboration between the entity 180 and the entity 170. Because of the aforedescribed limitations, however, the entity 180 can be assured that no user of the entity 170, such as the exemplary user 171, has sufficient administrative capability to breach the boundary of the chamber 140 and access, such as from the chamber 130, or from virtual machines outside the chamber 130, the data in the private storage 310 in the chamber 140, nor would any such user be able to perform, modify, or detect the execution of applications in the workload virtual machine 320 in the chamber 140.

Figure 4:
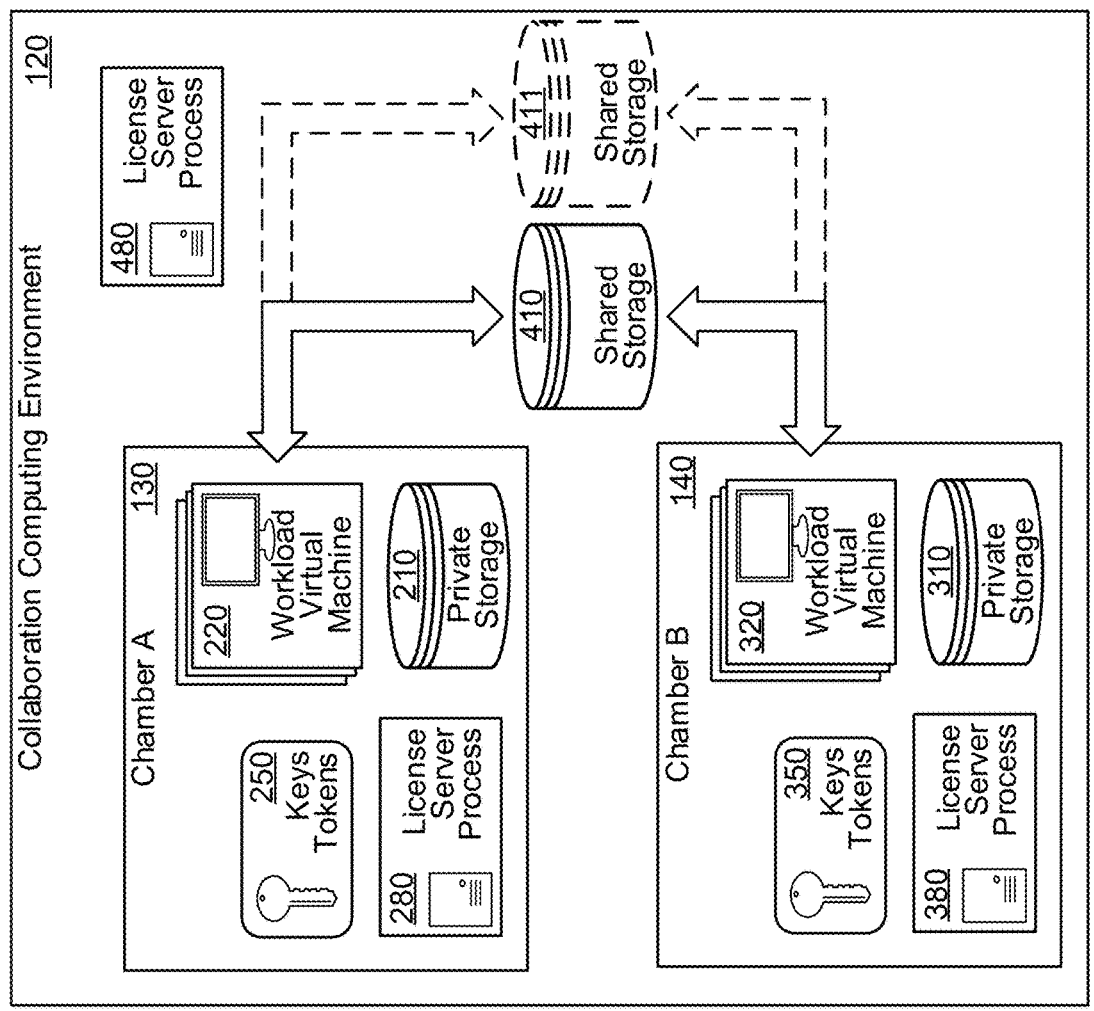
FIG. 4 is a system diagram of an exemplary collaboration computing environment with multiple distinct and isolated single-entity chambers and a storage shared between them.
Figure 4:
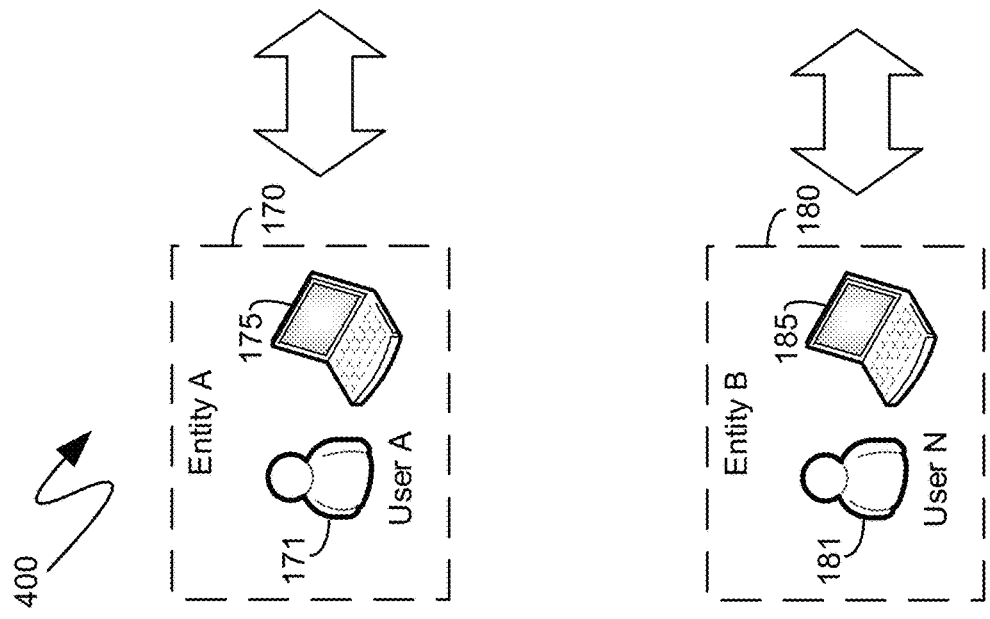

Turning to FIG. 4, the exemplary system 400 shown therein illustrates an exemplary collaboration computing environment 120, comprising the aforedescribed chambers 130 and 140, and additionally comprising a shared storage, such as the exemplary shared storage 410. According to one aspect, a shared storage, such as the exemplary shared storage 410, which can be established within the collaboration computing environment 120, but not as part of the isolation of the chamber 130 or the chamber 140, can enable the exchange of data between the chambers in a secure manner. As utilized herein, the term "shared storage" can mean either a single physical storage volume, a single logical storage volume, such as a single partition, or any other encapsulation of a pre-defined quantity of data storage. The shared storage, such as the exemplary shared storage 410, can have differing access granted to the various chambers, such as the exemplary chambers 130 and 140. For example, the workload virtual machine 220, in the chamber 130, can be granted access to some or all of the shared storage 410. For example, the workload virtual machine 220 can be granted access to all of the shared storage 410, but such access can be limited to read-only access, thereby preventing a user of the workload virtual machine 220, such as the exemplary user 171, from modifying any data stored in the shared storage 410. As another example, the workload virtual machine 220 can be granted more complete access, such as read/write access, but such access can be granted to only a portion of the shared storage 410, such as specific files or specific directories. As yet another example, multiple different shared storages, such as the exemplary shared storage 410 and the exemplary shared storage 411, can be created, with differing access rights for the workload virtual machines 220 and 320. For example, the exemplary workload virtual machine 220 can have read-only access to shared storage 410 and read/write access to shared storage 411, while the exemplary workload virtual machine 320 can have read-only access to shared storage 411 and read/write access to shared storage 410. In such an instance, the exemplary workload virtual machine 220 can write data to the shared storage 411 that can be shared to, and read by, the workload virtual machine 320 in the chamber 140, while, conversely, the exemplary workload virtual machine 320 can write data to shared storage 410 that can be shared to, and read by, the workload virtual machine 220 in the chamber 130. The various data access permissions, and limitations thereof, can be enforced through the mechanisms described above, such as SAS tokens, whitelists, authentication requirements, process permissions, and other like mechanisms. In such a manner data sharing between the chambers can be performed securely.

Figure 5:
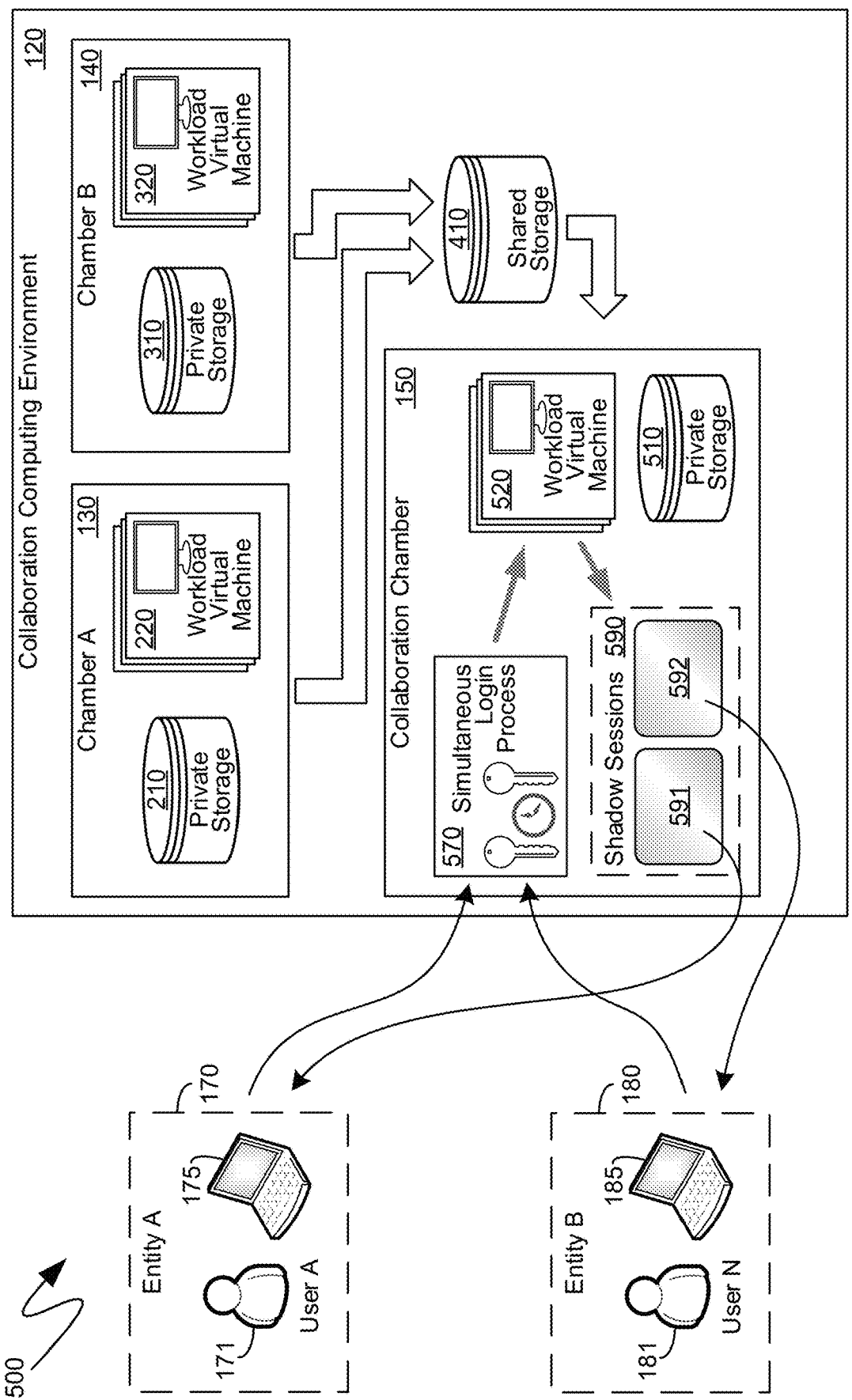
FIG. 5 is a system diagram of an exemplary collaboration computing environment with multiple distinct and isolated single-entity chambers and a multi-entity collaboration chamber.

Turning to FIG. 5, the exemplary system 500 shown therein illustrates an exemplary collaboration between entities and/or individual users utilizing a collaboration chamber, such as the exemplary collaboration chamber 150. While a shared storage provides for some amount of collaboration, in certain instances collaboration may require that various secrets of one or more of the entities be made available to counterparty entities, whether such secrets are in the form of special tools implemented via executable applications or other computer-executable instructions, specific data arrangements, organizations or analysis, or combinations thereof. In such instances, a collaboration chamber, such as the exemplary collaboration chamber 150, can enable more complete information exchange in an environment where both entities and/or individual users can be fully aware of what the counterparty is doing. More specifically, a collaboration chamber, such as the exemplary collaboration chamber 150, can implement a simultaneous login process, such as the exemplary simultaneous login process 570, in order to access the workload virtual machine 520 in the collaboration chamber 150. A simultaneous login process 570 can delay login until all relevant entities and/or individual users have provided their login credentials. Subsequently, once logged in, shadow sessions, such as the exemplary shadow sessions 590, can enable each user, or each entity, to be aware of what the other is doing within the context of the workload virtual machine 520.

By way of an illustrative example, the entity 170 can have utilized the workload virtual machine 220 to generate data stored on the private storage 210, while the entity 180 can have utilized the workload virtual machine 320 to generate data stored on the private storage 310. A shared storage, such as the exemplary shared storage 410, can be established, with at least a portion of the shared storage 410 being able to receive data from the chambers 130 and 140 and allow such data to be read by the chamber 150. For example, if the data is such that the entities 170 and 180 wish to protect as much as possible, then, for example, the workload virtual machine 220 and the workload virtual machine 320 can be granted write-only access to at least a portion of the shared storage 410, such as, for example, the partition 413. In such an instance, each entity can place the data from their respective private storages into the partition 413, but neither has sufficient permission to read the data therefrom. By contrast, the workload virtual machine 520 in the collaboration chamber 150 can have read access, such as read-only access or read/write access to the partition 413 and can read the data therefrom. In order for the entity 180 to ensure that its data, such as was originally stored in the private storage 310, is not being misused by the entity 170, and in order for the entity 170 to ensure that its data, originally stored in the private storage 210, is not being misused by the entity 180, the two entities, or selected users therefrom, such as the exemplary users 171 and 181, can utilize the simultaneous login process 570 to simultaneously log into the workload virtual machine 520. For example, the exemplary simultaneous login process 570 can delay logging in any one of the users 171 and 181 until the other also logs in. Once logged into the workload virtual machine 520, the relevant functions can be performed on the data that was originally sourced from the private storages 210 and 310, copied, or otherwise transferred, to the shared storage 410, and from there, to the private storage 410 of the collaboration chamber 150. Each of the users 171 and 181 can be fully aware of the processing being performed on the data in the private storage 510 by the workload virtual machine 520 in order to ensure that no undesirable actions, such as data copying, data analysis, or even the human reading of visually displayed data, is performed. Should one of the users attempt to perform such an action, the other user would be of it aware of it through the corresponding shadow session. In such a manner, the collaboration computing environment 120 can facilitate collaboration among entities and/or individual users that do not otherwise have a trust relationship between them.

Figure 6:
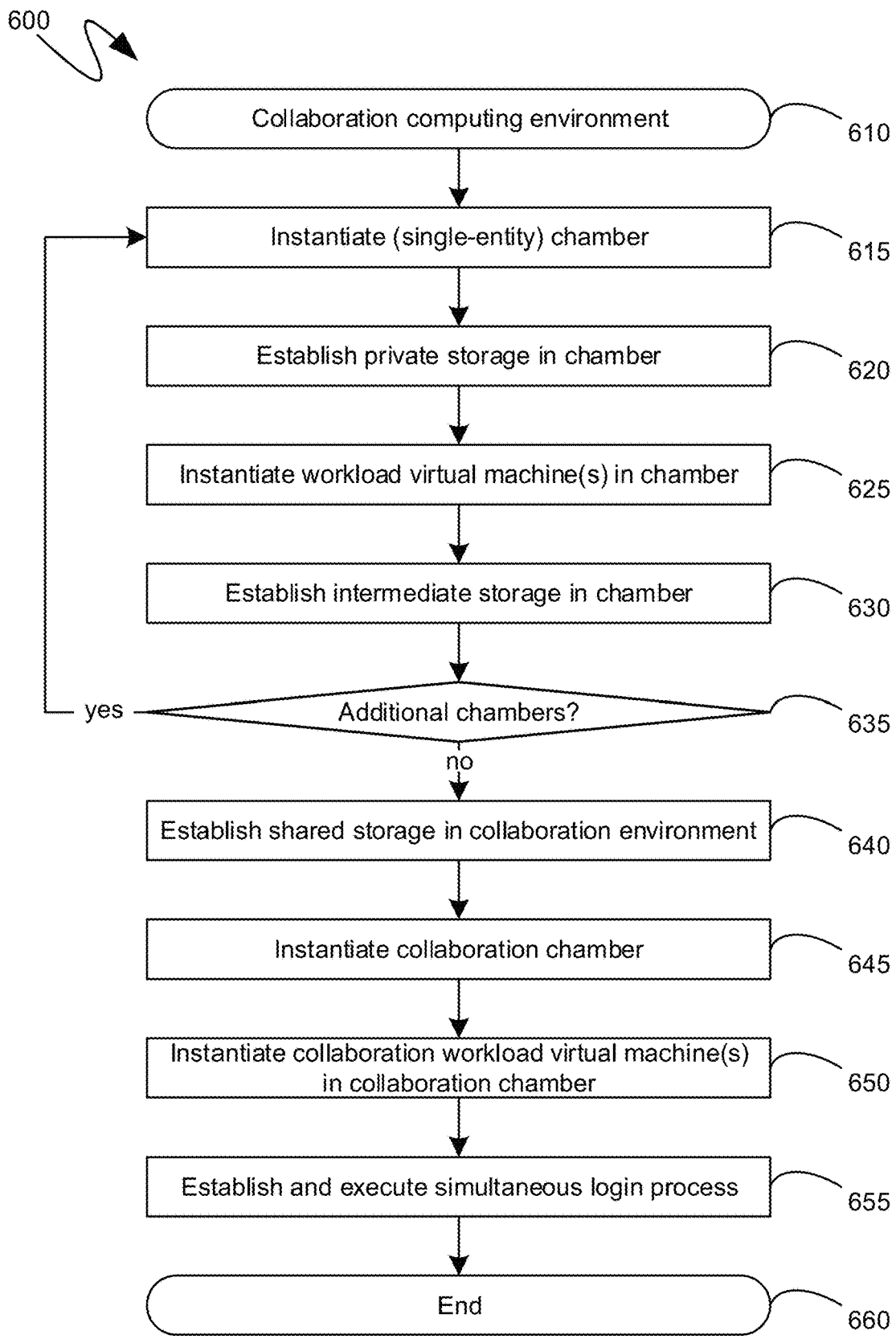
FIG. 6 is a flow diagram of an exemplary series of steps establishing a collaboration computing environment.

Turning to FIG. 6, the flow diagram 600 shown therein illustrates an exemplary series of steps by which a collaboration computing environment, such as that detailed above, can be established, such as at the invocation of one or more of the entities, and/or individual users that may seek to utilize such collaboration computing environment collaborate with other entities and/or individual users with whom they do not have an established trust relationship. Such an invocation, at step 610, can trigger the subsequent actions. According to one aspect, at step 615, a chamber can be instantiated for a single entity and/or individual user by establishing the protections and limitations detailed above. Such protections and limitations can include the establishment of private storage in the chamber, such as at step 620, with such private storage being denied outside network access, such as through a prevention of and the signing of an IP address, or other like isolation tactics. Additionally, the instantiation of a chamber can include the instantiation of one or more workload virtual machines, such as at step 625. As indicated previously, such virtual machines can be limited in that certain administrator access rights and administrative accounts are deactivated, certain data access and/or export commands can be deprecated, and other like affirmative limitations. Consequently, the instantiation of such virtual machines can include the execution of computer executable instructions that can set the appropriate settings, parameters, preferences, and other like information to affect the described isolations and/or limitations. Other functionality associated with the chamber can likewise be instantiated as part of the instantiation of the chamber. For example, at step 630, an intermediate storage can be established in the chamber. As indicated previously, such an intermediate storage can be monitored and data placed into such intermediate storage can be copied and/or moved to the private storage, established at step 620, by a data move process that can execute as part of the chamber. Additionally, the instantiation of the chamber can include the execution of such a data move process.

At step 635, a determination can be made as to whether additional chambers should be created in a like manner. More specifically, while described above within the context of a collaboration between two entities, the described collaboration computing environment can be extended to three or more entities in a straightforward manner with the above described mechanisms. Accordingly, at step 635, the flow diagram 600 can loop through steps 615 through 630 for each additional chamber that needs to be created for each additional entity and/or individual user. For shorthand reference within the drawing, such chambers are referred to as "single-entity" chambers to distinguish from the collaboration chamber.

At step 640, a shared storage can be created by which data can be exported out of the chambers created at steps 615 through 630, such as in the manner detailed above. At step 645, a collaboration chamber, such as the collaboration chamber described above, can be instantiated. As with the instantiation of the "single-entity" chamber at step 615, the instantiation of the collaboration chamber at step 645 can entail the establishment, execution, and other like performance of the relevant data storage, data isolation functionality, and other like aspects that enable the mechanisms described above. Thus, for example, at step 650, one or more collaboration workload virtual machines can be instantiated. As indicated previously, the instantiation of such collaboration workload virtual machines can include the establishment of a simultaneous login process, such as at step 555. According to one aspect a simultaneous login process can define necessary entities and/or individual users. For example, one entity may allow the simultaneous login process to continue if any one of a specific number of users from that entity are available for login. As another example, a different entity may allow the simultaneous login process to continue only if multiple ones of a defined set of users from that entity are available for login. The establishment and execution of the simultaneous login process, such as at step 655, can include the defining of the minimum necessary users, whether by aggregate quantities, or individual identities, as well as the triggering of the login process itself when the defined minimum necessary users are established. Further details regarding the simultaneous login process is provided further below in the descriptions of FIG. 8.

Figure 7:
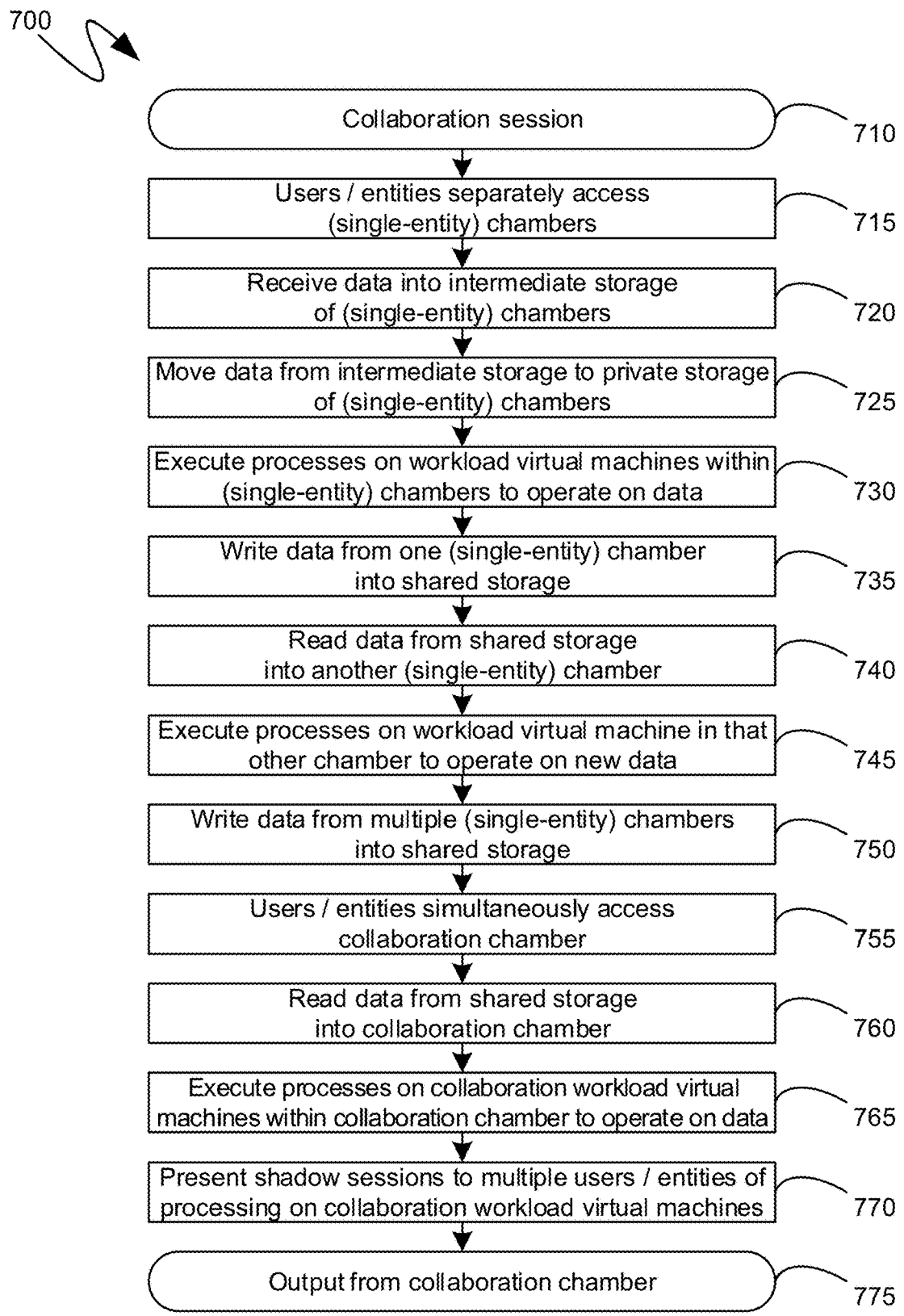
FIG. 7 is a flow diagram of an exemplary series of steps utilizing a collaboration computing environment.

Turning first to FIG. 7, the exemplary flow diagram shown therein illustrates an exemplary series of steps that can be performed as part of the utilization of a collaboration computing environment, such as that detailed above. For example, at step 710, a collaboration session between two entities and/or individual users can commence. Each entity can separately access their respective chambers at step 715. Such access can include the uploading of data into the intermediate storage of each entity's respective chamber, such as is illustrated by step 720. At step 725, a process, such as the aforedescribed data move process, can listen or otherwise monitor the intermediate storage to detect inbound data and move and/or copy such data to the private storage of the chamber. At step 730, each of the entities and/or users can execute application programs, or other processes, on the workload of virtual machines within their respective chambers to operate on the data that was uploaded, and then subsequently copied to the private storage. If one entity needs to share a specific data set with another entity, such data can be written into shared storage from one chamber at step 735, and then the read from the shared storage by the workload virtual machines of another chamber at step 740. Additional processing can then be performed in that chamber at step 745.

At some point, to complete the collaboration, data from multiple ones of the individual chambers can be written to shared storage, such as at step 750. At step 755, the entities and/or individual users can simultaneously access a collaboration chamber, and can utilize the collaboration workload virtual machines executing therein to read the data from the shared storage, as represented by step 760. At step 765 processes can be executed on the collaboration workload virtual machines to operate on such data, with shadow sessions allowing each entity and/or individual user to monitor the processing and any other actions being performed utilizing the collaboration workload virtual machines. Such shadow sessions can be presented to the logged in users at step 770. Output from the collaboration chamber, such as at step 775, can represent the achievement of the goal of the collaboration and, accordingly, can end of the relevant processing graphically represented by the flow diagram 700.

Figure 8:
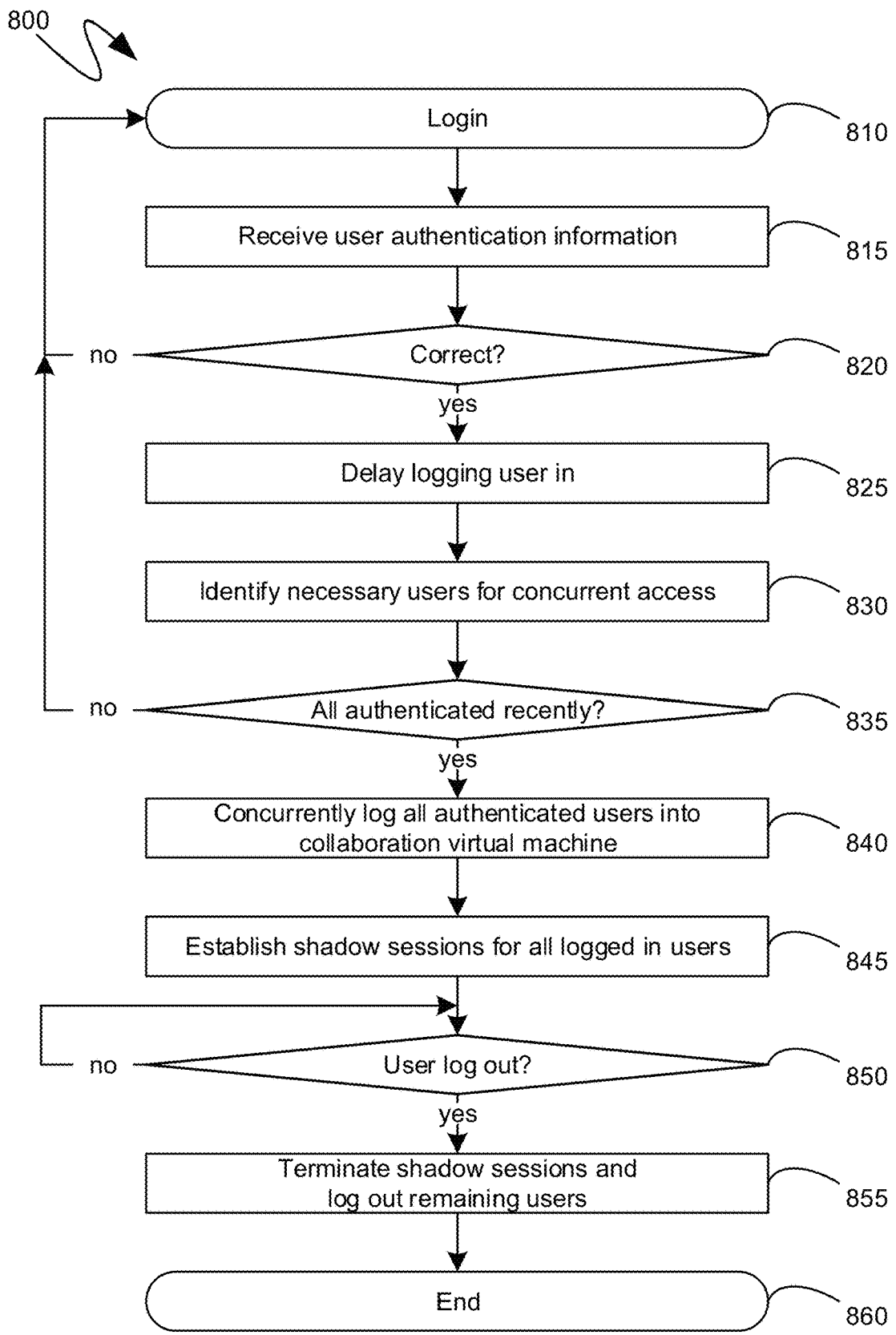
FIG. 8 is a flow diagram of an exemplary series of steps providing a concurrent utilization of a collaboration workload virtual machine.

Turning to FIG. 8, an exemplary simultaneous login process is illustrated by the exemplary flow diagram 800. Initially, one user can attempt to login at step 810. At step 815, the user's authentication information, such as their username, password, login token, challenge response, or other like authentication information, can be received. The authentication information can then be verified at step 820, where, if the authentication information is not accurate processing can return to step 810. If, however, at step 820, it is determined that the user's authentication information is accurate, according to one aspect, the users logging in can be delayed at step 825. At step 830 the necessary users for concurrent access, such as defined previously, can be identified, such as by being read from a file, directory, registry, or other like setting, and a determination can be made, such as at step 835, whether all of the necessary users have concurrently authenticated. For example, the simultaneous login process can require that all of the necessary users provide their authentication information within a defined amount of time or within a time range, such as within a minute of one another. If all necessary users have not authenticated within that time the processing can return to step 810 and cycle until all of the necessary users have authenticated within the defined time range. At that point, processing can proceed with step 840, wherein the authenticated users are concurrently logged into the collaboration virtual machine. At step 845, shadow sessions can be established for all logged in users such that the actions, invocations, utilized functionality, and other like computational endeavors performed by anyone logged in user can be observed, monitored, or otherwise detected coincidentally by the other users via the shadow sessions. The users' utilization of the collaboration virtual machine can continue until one or more of the necessary users log out, as illustrated by the loop around the step 850. Once one or more of the necessary users log out, as determined at step 850, processing can proceed to step 855 where the remaining users can be logged out and the shadow sessions can be terminated. The relevant processing can then end at step 860.

Figure 9:
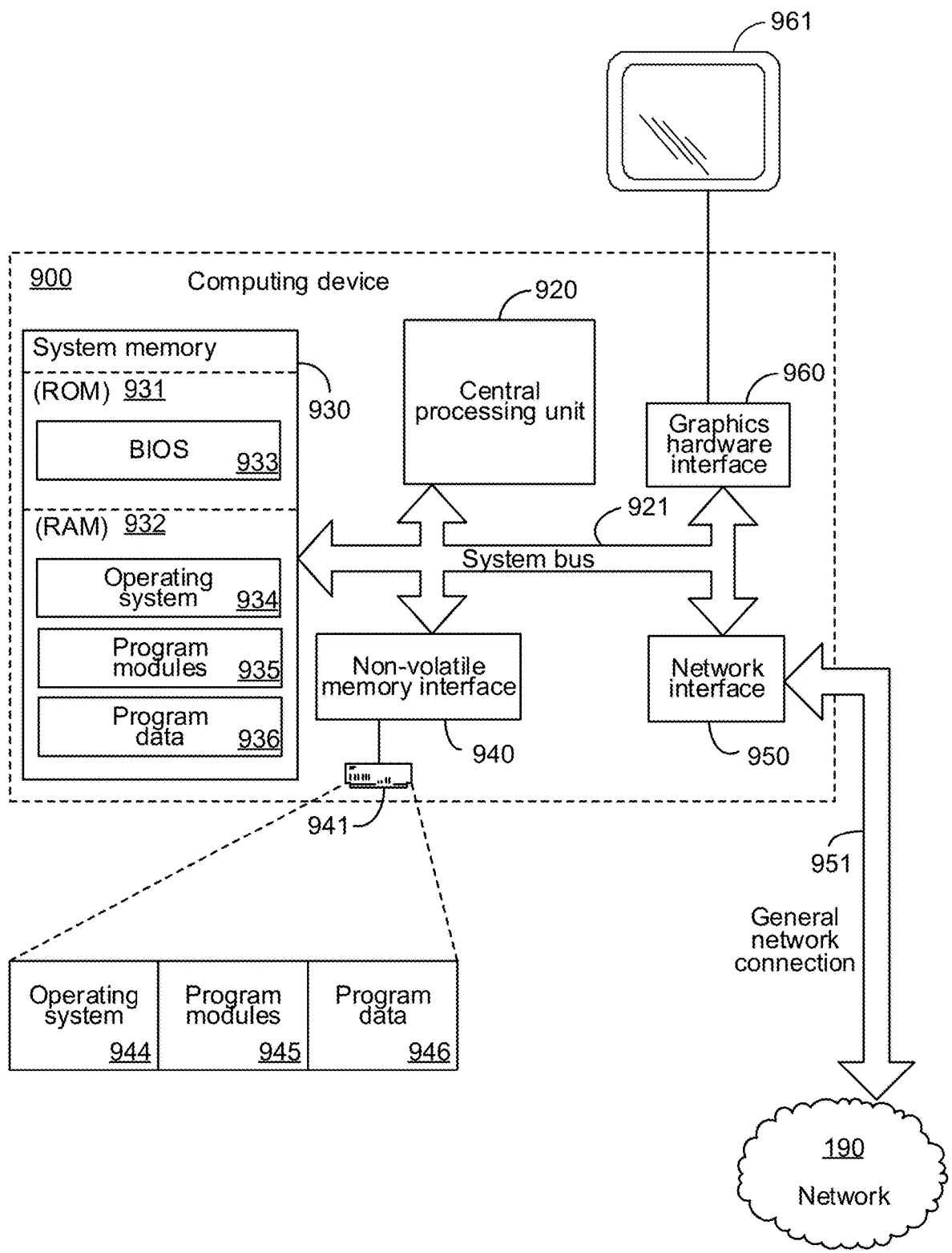
FIG. 9 is a block diagram of an exemplary computing device.

Turning to FIG. 9, an exemplary computing device 900 is illustrated which can perform some or all of the mechanisms and actions described above. The exemplary computing device 900 can include, but is not limited to, one or more central processing units (CPUs) 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. The computing device 900 can optionally include graphics hardware, including, but not limited to, a graphics hardware interface 960 and a display device 961, which can include display devices capable of receiving touch-based user input, such as a touch-sensitive, or multi-touch capable, display device. Depending on the specific physical implementation, one or more of the CPUs 920, the system memory 930 and other components of the computing device 900 can be physically co-located, such as on a single chip. In such a case, some or all of the system bus 921 can be nothing more than silicon pathways within a single chip structure and its illustration in FIG. 9 can be nothing more than notational convenience for the purpose of illustration.

The computing device 900 also typically includes computer readable media, which can include any available media that can be accessed by computing device 900 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 900. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer content between elements within computing device 900, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, other program modules 935, and program data 936.

The computing device 900 may also include other removable/non-removable, volatile/nonvolatile computer storage media. By way of example only, FIG. 9 illustrates a hard disk drive 941 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 941 is typically connected to the system bus 921 through a non-volatile memory interface such as interface 940.

The drives and their associated computer storage media discussed above and illustrated in FIG. 9, provide storage of computer readable instructions, data structures, program modules and other data for the computing device 900. In FIG. 9, for example, hard disk drive 941 is illustrated as storing operating system 944, other program modules 945, and program data 946. Note that these components can either be the same as or different from operating system 934, other program modules 935 and program data 936. Operating system 944, other program modules 945 and program data 946 are given different numbers hereto illustrate that, at a minimum, they are different copies.

The computing device 900 may operate in a networked environment using logical connections to one or more remote computers. The computing device 900 is illustrated as being connected to the general network connection 951 (to the network 190) through a network interface or adapter 950, which is, in turn, connected to the system bus 921. In a networked environment, program modules depicted relative to the computing device 900, or portions or peripherals thereof, may be stored in the memory of one or more other computing devices that are communicatively coupled to the computing device 900 through the general network connection 961. It will be appreciated that the network connections shown are exemplary and other means of establishing a communications link between computing devices may be used.

Although described as a single physical device, the exemplary computing device 900 can be a virtual computing device, in which case the functionality of the above-described physical components, such as the CPU 920, the system memory 930, the network interface 940, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 900 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, multiple computing devices in aggregate comprising: processing units; and computer-readable storage media comprising computer-executable instructions, which, when executed by at least some of the processing units, cause at least some of the multiple computing devices to: instantiate a first chamber in a collaboration computing environment, wherein the instantiating the first chamber comprises: establishing a first private storage to which access from outside of the first chamber is prevented; instantiating a first workload virtual machine executing within the first chamber, the first workload virtual machine having access to the first private storage; deactivating, within the first workload virtual machine's context, data access commands that would be utilizable from within the first workload virtual machine to transmit data from the first private storage to outside of the first chamber establishing a first intermediate storage to which write access from outside of the first chamber, through pre-defined pathways, is allowed; and; and invoking a first data move process that executes within the first chamber and moves data from the first intermediate storage to the first private storage.

A second example is the computing devices of the first example, wherein the computer-readable storage media comprise further computer-executable instructions, which, when executed by at least some of the processing units, cause at least some of the multiple computing devices to: prevent read access to the first intermediate storage from outside of the first chamber.

A third example is the computing devices of the second example, wherein the allowing the write access to the first intermediate storage from outside of the first chamber and the preventing the read access to the first intermediate storage from outside of the first chamber both comprise generating storage access tokens enumerating at least one of the allowed write access or the prevented read access.

A fourth example is the computing devices of the first example, wherein the instantiating the first chamber further comprises preventing network access from outside of the first chamber to network addresses assigned within the first chamber.

A fifth example is the computing devices of the first example, wherein the instantiating the first chamber further comprises instantiating a first access virtual machine that is external to the first chamber, but is part of the collaboration computing environment; wherein further the instantiating the first workload virtual machine is only accessible through the first access virtual machine.

A sixth example is the computing devices of the first example, wherein the instantiating the first chamber further comprises instantiating a first directory process executing within the first chamber, the first directory process delineating users allowed to access the first workload virtual machine.

A seventh example is the computing devices of the first example, wherein the instantiating the first chamber further comprises instantiating a license server process executing within the first chamber, the license server process limiting which applications can execute on the first workload virtual machine.

An eighth example is the computing devices of the first example, wherein the computer-readable storage media comprise further computer-executable instructions, which, when executed by at least some of the processing units, cause at least some of the multiple computing devices to: instantiate a second chamber in the collaboration computing environment, the second chamber being distinct and isolated from the first chamber, wherein the instantiating the second chamber comprises: establishing a second private storage to which access from outside of the second chamber is prevented; instantiating a second workload virtual machine executing within the second chamber, the second workload virtual machine having access to the second private storage; deactivating, within the second workload virtual machine's context, data access commands that would be utilizable from within the second workload virtual machine to transmit data from the second private storage to outside of the second chamber; establishing a second intermediate storage to which write access from outside of the second chamber, through pre-defined pathways, is allowed; and invoking a second data move process that executes within the second chamber and moves data from the second intermediate storage to the second private storage.

A ninth example is the computing devices of the eighth example, wherein the computer-readable storage media comprise further computer-executable instructions, which, when executed by at least some of the processing units, cause at least some of the multiple computing devices to: establish a shared storage in the collaboration computing environment, the shared storage being distinct from both the first chamber and the second chamber, wherein the establishing the shared storage comprises: granting access to a first portion of the shared storage to the first workload virtual machine executing with the first chamber; and granting access to the first portion of shared storage to the second workload virtual machine executing with the second chamber.

A tenth example is the computing devices of the ninth example, wherein the computer-readable storage media comprise further computer-executable instructions, which, when executed by at least some of the processing units, cause at least some of the multiple computing devices to: prevent, within both the first workload virtual machine's context and the second workload virtual machine's context, execution of applications other than applications that are stored on the shared storage.

An eleventh example is the computing devices of the ninth example, wherein the establishing the shared storage further comprises: granting access to a second portion of the shared storage to the first workload virtual machine; denying access to the second portion of the shared storage to the second workload virtual machine; granting access to a third portion of the shared storage to the second workload virtual machine; and denying access to the third portion of the shared storage to the first workload virtual machine.

A twelfth example is the computing devices of the eighth example, wherein the computer-readable storage media comprise further computer-executable instructions, which, when executed by at least some of the processing units, cause at least some of the multiple computing devices to: instantiate a shared license server process executing within the collaboration computing environment but distinct from the first and second chambers, the shared license server process aggregating licensing requests from applications executing on the first workload virtual machine and licensing requests from applications executing on the second workload virtual machine.

A thirteenth example is the computing devices of the eighth example, wherein the computer-readable storage media comprise further computer-executable instructions, which, when executed by at least some of the processing units, cause at least some of the multiple computing devices to: instantiate a collaboration chamber in the collaboration computing environment, the collaboration chamber being distinct and isolated from both the first chamber and the second chamber, wherein the instantiating the collaboration chamber comprises: instantiating a collaboration workload virtual machine executing within the collaboration chamber; defining a simultaneous login set of multiple users for the collaboration workload virtual machine, the simultaneous login set comprising a first user having access privileges on the first workload virtual machine and a second user having access privileges on the second workload virtual machine; and executing a login process on the collaboration workload virtual machine, the login process delaying logging into the collaboration workload virtual machine by any user of the simultaneous login set until at least the first user and the second user have concurrently provided their login credentials.

A fourteenth example is the computing devices of the thirteenth example, wherein the login process creates shadow sessions for the first and second users, once the first and second users are logged into the collaboration workload virtual machine, such that the first user can detect actions of the second user on the collaboration workload virtual machine and the second user can detect actions of the first user on the collaboration workload virtual machine.

A fifteenth example is the computing devices of the thirteenth example, wherein the computer-readable storage media comprise further computer-executable instructions, which, when executed by at least some of the processing units, cause at least some of the multiple computing devices to: establish a shared storage in the collaboration computing environment, the shared storage being distinct from the first chamber, the second chamber and the collaboration chamber, wherein the establishing the shared storage comprises: granting write access to a first portion of the shared storage to the first and second workload virtual machines; denying read access to the first portion of the shared storage to the first and second workload virtual machines; and granting read and write access to the first portion of the shared storage to the collaboration workload virtual machine.

A sixteenth example is a method of providing a collaboration computing environment, the method comprising: instantiating a first chamber in the collaboration computing environment, wherein the instantiating the first chamber comprises: establishing a first private storage to which access from outside of the first chamber is prevented; instantiating a first workload virtual machine executing within the first chamber, the first workload virtual machine having access to the first private storage; deactivating, within the first workload virtual machine's context, data access commands that would be utilizable from within the first workload virtual machine to copy data out of the first private storage; establishing a first intermediate storage to which write access from outside of the first chamber, through pre-defined pathways, is allowed; and invoking a first data move process that executes within the first chamber and moves data from the first intermediate storage to the first private storage.

A seventeenth example is the method of the sixteenth example, further comprising: instantiating a second chamber in the collaboration computing environment, the second chamber being distinct and isolated from the first chamber, wherein the instantiating the second chamber comprises: establishing a second private storage to which access from outside of the second chamber is prevented; and instantiating a second workload virtual machine executing within the second chamber, the second workload virtual machine having access to the second private storage; and instantiating a collaboration chamber in the collaboration computing environment, the collaboration chamber being distinct and isolated from both the first chamber and the second chamber, wherein the instantiating the collaboration chamber comprises: instantiating a collaboration workload virtual machine executing within the collaboration chamber; defining a simultaneous login set of multiple users for the collaboration workload virtual machine, the simultaneous login set comprising a first user having access privileges on the first workload virtual machine and a second user having access privileges on the second workload virtual machine; and executing a login process on the collaboration workload virtual machine, the login process delaying logging into the collaboration workload virtual machine by any user of the simultaneous login set until at least the first user and the second user have concurrently provided their login credentials.

An eighteenth example is a method of providing a collaboration computing environment, the method comprising: receiving a first data into a first intermediate storage that is part of a first chamber in the collaboration computing environment; moving the first data from the first intermediate storage to a first private storage to which access from outside of the first chamber is prevented, the first private storage being a part of the first chamber; executing a first process on a first workload virtual machine within the first chamber, the first workload virtual machine having access to the first private storage, the first process reading the first data and generating a second data that is also stored on the first private storage; and deactivating, within the first workload virtual machine's context, data access commands that would be utilizable from within the first workload virtual machine to transmit data from the first private storage to outside of the first chamber.

A nineteenth example is the method of the eighteenth example, further comprising: copying the second data from the first private storage to a shared storage that is distinct from, and not part of, the first chamber; and executing a second process on a second workload virtual machine within a second chamber that is distinct and isolated from the first chamber, the second process reading the second data from the shared storage; wherein the shared storage is distinct from the second chamber.

A twentieth example is the method of the eighteenth example, further comprising: copying the second data from the first private storage to a shared storage that is distinct from, and not part of, the first chamber; executing a second process on a second workload virtual machine within a second chamber that is distinct and isolated from the first chamber, the second process generating a third data; copying the third data from the second private storage to the shared storage; simultaneously logging a first user and a second user into a collaboration workload virtual machine, the collaboration workload virtual machine executing within a collaboration chamber that is distinct and isolated from both the first and second chambers; and executing a third process on the collaboration workload virtual machine, the third process reading the second and third data from the shared storage; wherein processes executing on the first workload virtual machine are prevented from reading the third data from the shared storage; wherein processes executing on the second workload virtual machine are prevented from reading the second data from the shared storage; and wherein neither the first user nor the second user can log into the collaboration workload virtual machine until both the first user and the second user have concurrently provided their login credentials.

As can be seen from the above descriptions, mechanisms for generating and utilizing multi-chamber hosted computing environments for collaborative development between untrusted partners have been presented. In view of the many possible variations of the subject matter described herein, we claim as our invention all such embodiments as may come within the scope of the following claims and equivalents thereto.

We claim:

1. A computer system comprising:
   a processing unit; and
   a computer-readable storage medium comprising computer-executable instructions, which, when executed by the processing unit, causes the computer system to:
      instantiate a first chamber in a collaboration computing environment, wherein instantiating the first chamber comprises:
         establishing a first private storage to which access from outside of the first chamber is prevented;
         instantiating a first workload virtual machine executing within the first chamber, the first workload virtual machine having access to the first private storage;
         deactivating, within a first context of the first workload virtual machine, data access commands that would be utilizable from within the first workload virtual machine to transmit data from the first private storage to outside of the first chamber;
         establishing a first intermediate storage to which write access from outside of the first chamber, through a pre-defined pathway, is allowed;
         invoking a first data move process that executes within the first chamber and moves data from the first intermediate storage to the first private storage; and
         instantiating a license server process executing within the first chamber, the license server process limiting which applications can execute on the first workload virtual machine.

2. The computer system of claim 1, wherein the when executed by the processing unit, causes the computer system to:

prevent read access to the first intermediate storage from outside of the first chamber.

3. The computer system of claim 2, wherein,
allowing write access to the first intermediate storage from outside of the first chamber comprises generating a storage access token enumerating the write access; and
preventing read access to the first intermediate storage from outside of the first chamber comprises generating a storage access token enumerating the read access.

4. The computer system of claim 1, wherein instantiating the first chamber further comprises preventing network access from outside of the first chamber to network addresses assigned within the first chamber.

5. The computer system of claim 1, wherein instantiating the first chamber further comprises instantiating a first access virtual machine that is external to the first chamber, but is part of the collaboration computing environment;
wherein further the first workload virtual machine is only accessible through the first access virtual machine.

6. The computer system of claim 1, wherein instantiating the first chamber further comprises instantiating a first directory process executing within the first chamber, the first directory process delineating users allowed to access the first workload virtual machine.

7. The computer system of claim 1, wherein the computer-readable storage medium comprises further computer-executable instructions, which, when executed by the processing unit, causes the computer system to:
instantiate a second chamber in the collaboration computing environment, the second chamber being distinct and isolated from the first chamber, wherein instantiating the second chamber comprises:
establishing a second private storage to which access from outside of the second chamber is prevented;
instantiating a second workload virtual machine executing within the second chamber, the second workload virtual machine having access to the second private storage;
deactivating, within a second context of the second workload virtual machine, data access commands that would be utilizable from within the second workload virtual machine to transmit data from the second private storage to outside of the second chamber;
establishing a second intermediate storage to which write access from outside of the second chamber, through a pre-defined pathway, is allowed; and
invoking a second data move process that executes within the second chamber and moves data from the second intermediate storage to the second private storage.

8. The computer system of claim 7, wherein the computer-readable storage medium comprises further computer-executable instructions, which, when executed by the processing unit, causes the computer system to:
establish a shared storage in the collaboration computing environment, the shared storage being distinct from both the first chamber and the second chamber, wherein establishing the shared storage comprises:
granting access to a first portion of the shared storage to the first workload virtual machine executing with the first chamber; and
granting access to the first portion of the shared storage to the second workload virtual machine executing with the second chamber.

9. The computer system of claim 8, wherein the computer-readable storage medium comprises further computer-executable instructions, which, when executed by the processing unit, causes the computer system to:
prevent, within both the first context and the second context, execution of applications other than applications that are stored on the shared storage.

10. The computer system of claim 8, wherein establishing the shared storage further comprises:
granting access to a second portion of the shared storage to the first workload virtual machine;
denying access to the second portion of the shared storage to the second workload virtual machine;
granting access to a third portion of the shared storage to the second workload virtual machine; and
denying access to the third portion of the shared storage to the first workload virtual machine.

11. The computer system of claim 7, wherein the computer-readable storage medium comprises further computer-executable instructions, which, when executed by the processing unit, causes the computer system to:
instantiate a shared license server process executing within the collaboration computing environment but distinct from the first chamber and the second chamber, the shared license server process aggregating licensing requests from applications executing on the first workload virtual machine and licensing requests from applications executing on the second workload virtual machine.

12. The computer system of claim 7, wherein the computer-readable storage medium comprises further computer-executable instructions, which, when executed by the processing unit, causes the computer system to:
instantiate a collaboration chamber in the collaboration computing environment, the collaboration chamber being distinct and isolated from both the first chamber and the second chamber, wherein instantiating the collaboration chamber comprises:
instantiating a collaboration workload virtual machine executing within the collaboration chamber;
defining a simultaneous login set of multiple users for the collaboration workload virtual machine, the simultaneous login set comprising a first user having access privileges on the first workload virtual machine and a second user having access privileges on the second workload virtual machine; and
executing a login process on the collaboration workload virtual machine, the login process delaying logging into the collaboration workload virtual machine by any user of the simultaneous login set until at least the first user and the second user have concurrently provided their login credentials.

13. The computer system of claim 12, wherein the login process creates shadow sessions for the first user and the second user, once the first user and the second user are logged into the collaboration workload virtual machine, such that the first user can detect actions of the second user on the collaboration workload virtual machine and the second user can detect actions of the first user on the collaboration workload virtual machine.

14. The computer system of claim 12, wherein the computer-readable storage medium comprises further computer-executable instructions, which, when executed by the processing unit, causes the computer system to:
establish a shared storage in the collaboration computing environment, the shared storage being distinct from the first chamber, the second chamber and the collaboration chamber, wherein establishing the shared storage comprises:
granting write access to a first portion of the shared storage to the first workload virtual machine and the second workload virtual machine;
denying read access to the first portion of the shared storage to the first workload virtual machine and the second workload virtual machine; and
granting read and write access to the first portion of the shared storage to the collaboration workload virtual machine.

15. A method of providing a collaboration computing environment, the method comprising:
instantiating a first chamber in the collaboration computing environment, wherein instantiating the first chamber comprises:
establishing a first private storage to which access from outside of the first chamber is prevented;
instantiating a first workload virtual machine executing within the first chamber, the first workload virtual machine having access to the first private storage;
deactivating, within a first context of the first workload virtual machine, data access commands that would be utilizable from within the first workload virtual machine to copy data out of the first private storage;
establishing a first intermediate storage to which write access from outside of the first chamber, through a pre-defined pathway, is allowed; and
invoking a first data move process that executes within the first chamber and moves data from the first intermediate storage to the first private storage;
instantiating a second chamber in the collaboration computing environment, the second chamber being distinct and isolated from the first chamber, wherein instantiating the second chamber comprises:
establishing a second private storage to which access from outside of the second chamber is prevented;
instantiating a second workload virtual machine executing within the second chamber, the second workload virtual machine having access to the second private storage;
deactivating, within a second context of the second workload virtual machine, data access commands that would be utilizable from within the second workload virtual machine to transmit data from the second private storage to outside of the second chamber;
establishing a second intermediate storage to which write access from outside of the second chamber, through a pre-defined pathway, is allowed; and
invoking a second data move process that executes within the second chamber and moves data from the second intermediate storage to the second private storage; and
establishing a shared storage in the collaboration computing environment, the shared storage being distinct from both the first chamber and the second chamber, wherein establishing the shared storage comprises:
granting access to a first portion of the shared storage to the first workload virtual machine executing with the first chamber; and
granting access to the first portion of the shared storage to the second workload virtual machine executing with the second chamber.

16. The method of claim 15, further comprising:
instantiating a collaboration chamber in the collaboration computing environment, the collaboration chamber being distinct and isolated from both the first chamber and the second chamber, wherein instantiating the collaboration chamber comprises:
instantiating a collaboration workload virtual machine executing within the collaboration chamber;
defining a simultaneous login set of multiple users for the collaboration workload virtual machine, the simultaneous login set comprising a first user having access privileges on the first workload virtual machine and a second user having access privileges on the second workload virtual machine; and
executing a login process on the collaboration workload virtual machine, the login process delaying logging into the collaboration workload virtual machine by any user of the simultaneous login set until at least the first user and the second user have concurrently provided their login credentials.

17. A method of providing a collaboration computing environment, the method comprising:
receiving a first data into a first intermediate storage that is part of a first chamber in the collaboration computing environment;
moving the first data from the first intermediate storage to a first private storage to which access from outside of the first chamber is prevented, the first private storage being a part of the first chamber;
executing a first process on a first workload virtual machine within the first chamber, the first workload virtual machine having access to the first private storage, the first process reading the first data and generating a second data that is also stored on the first private storage;
deactivating, within a first context of the first workload virtual machine, data access commands that would be utilizable from within the first workload virtual machine to transmit data from the first private storage to outside of the first chamber;
copying the second data from the first private storage to a shared storage that is distinct from, and not part of, both the first chamber and a second chamber that is distinct and isolated from the first chamber; and
executing a second process on a second workload virtual machine within the second chamber, the second process reading the second data from the shared storage.

18. The method of claim 17, further comprising:
executing a third process on the second workload virtual machine, the second process generating a third data;
copying the third data from a second private storage that is a part of the second chamber and to which access from outside of the second chamber is prevented to the shared storage;
simultaneously logging a first user and a second user into a collaboration workload virtual machine, the collaboration workload virtual machine executing within a collaboration chamber that is distinct and isolated from both the first chamber and the second chamber; and
executing a fourth process on the collaboration workload virtual machine, the fourth process reading the second data and the third data from the shared storage, wherein,
first processes executing on the first workload virtual machine are prevented from reading the third data from the shared storage, second processes executing on the second workload virtual machine are prevented from reading the second data from the shared storage, and neither the first user nor the second user can log into the collaboration workload virtual machine until both the first user and the second user have concurrently provided their login credentials.

\* \* \* \* \*